Sept. 9, 1969 YOSHIYUKI NAKAZIMA ET AL 3,465,611

DUAL TOTALING MECHANISM FOR ADDING MACHINES

Filed Oct. 11, 1967

INVENTORS
YOSHIYUKI NAKAZIMA
KEN KOZASA

BY Hall, Pollock & Vande Sande

ATTORNEY

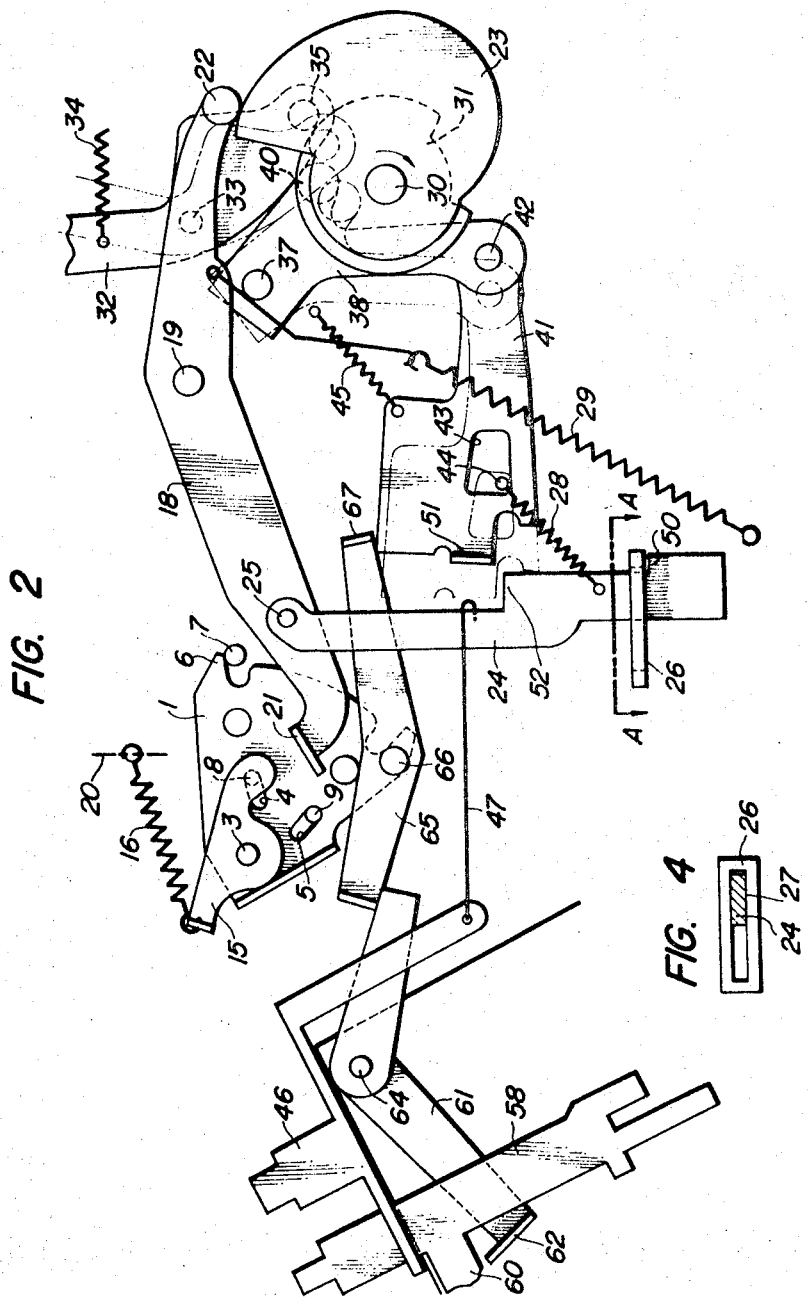

Sept. 9, 1969  YOSHIYUKI NAKAZIMA ET AL  3,465,611
DUAL TOTALING MECHANISM FOR ADDING MACHINES
Filed Oct. 11, 1967  5 Sheets-Sheet 3

INVENTORS
YOSHIYUKI NAKAZIMA
KEN KOZASA
BY Hall, Pollock & Vande Sande
ATTORNEY

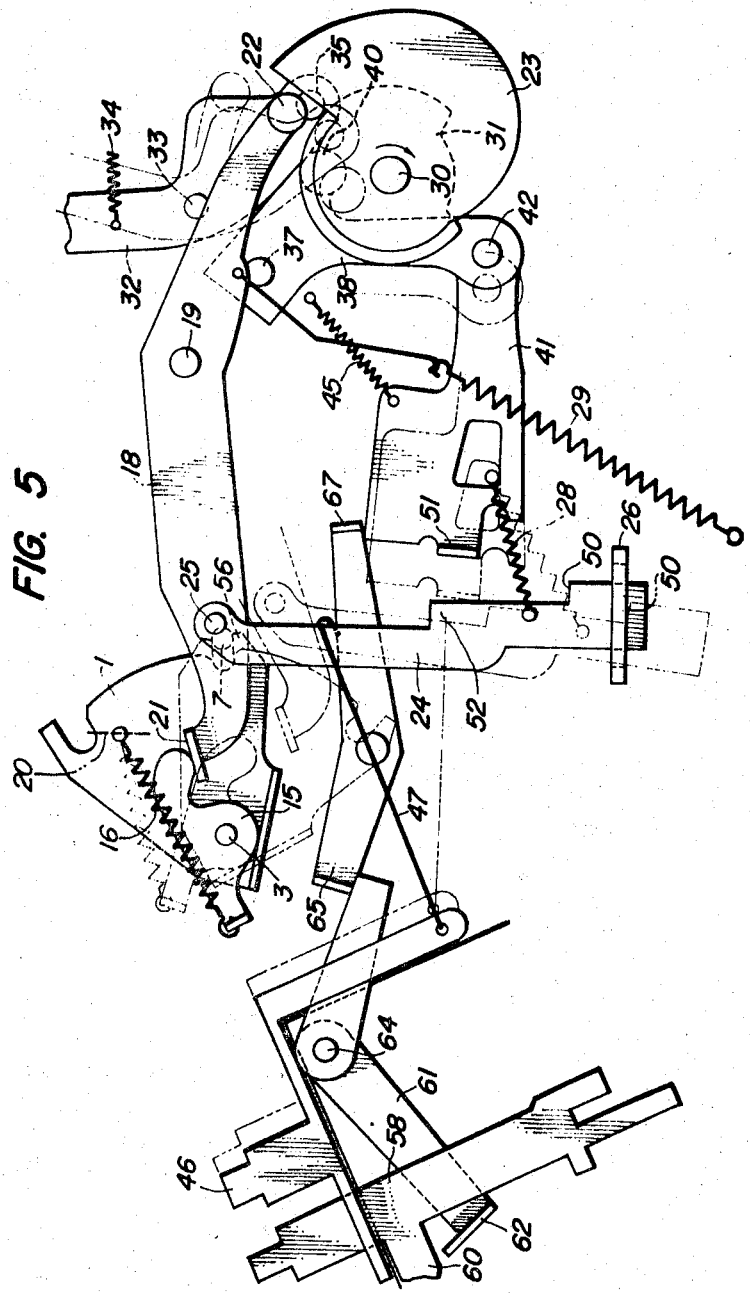

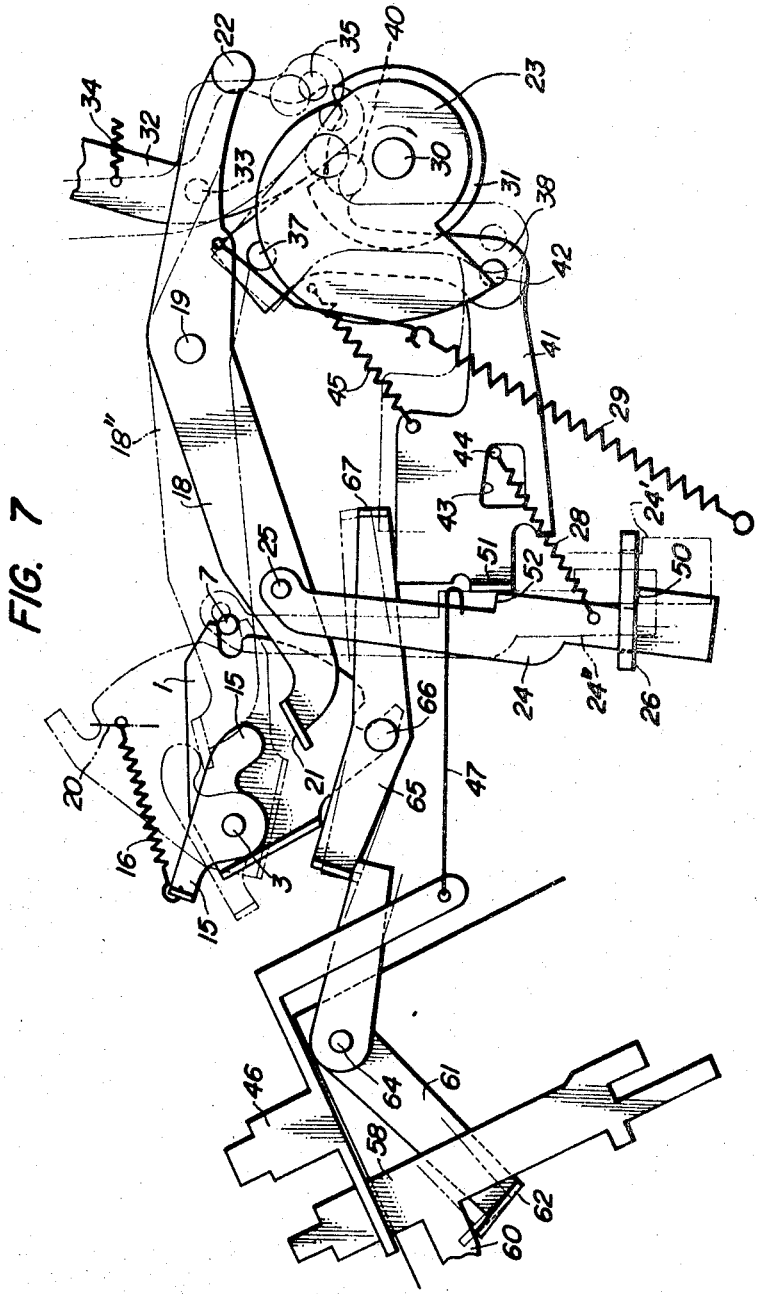

United States Patent Office 3,465,611
Patented Sept. 9, 1969

3,465,611
DUAL TOTALING MECHANISM FOR ADDING MACHINES
Yoshiyuki Nakazima, Sayama-shi, and Ken Kozasa, Tokyo, Japan, assignors to Citizen Watch Co., Ltd., Tokyo, Japan, a corporation of Japan
Filed Oct. 11, 1967, Ser. No. 674,413
Claims priority, application Japan, Oct. 22, 1966, 41/98,035
Int. Cl. F16h 57/00, 1/04
U.S. Cl. 74—405                    2 Claims

ABSTRACT OF THE DISCLOSURE

A dual totaling mechanism for an adding machine, comprising two sets for accumulator gears provided between two opposedly disposed supporting plates, one of said two sets of accumulator gears being adapted to be operated to accumulate the amounts set up, and the other to aggregate the totals figured out by said former accumulator gear.

---

The present invention relates to a dual totaling mechanism for an adding machine, which is capable of summation of the amounts set up for each machine cycle of such operation and concurrently, of aggregating the totals from the respective cycles of the completed summation operations.

In common types of adding machines with a single totaling mechanism used, for instance, in shops, the total of the amounts set up for each business transaction is printed on paper, wherein, however, a total figure entered into the machine for each business transaction has to be cancelled for the subsequent new cycle of summation operation. This makes it impracticable to automatically give account of the aggregate total business proceeds for the day. For this reason, an adding machine of the described model usually requires an additional summation mechanism which should be adapted for such calculation as in aggregating the totals from the respective summations completed, but such a mechanism will become structurally very complicated and therefore, the machine will naturally be a very costly one.

The object of the present invention is to provide means which is capable of achieving a dual totaling operation such as described in the preceding with an extremely simple mechanism. Adding machines of the type incorporating one adding or plus gear member, and one subtracting or minus gear member adapted for engagement with said plus gear member, have heretofore been known, whereas in the present invention, two gear members corresponding to those described in the above are accumulators which are both adapted to be operable as a plus gear and that independently of each other. One of the last-mentioned gear members gathers and totals the amounts set up for each machine cycle of such operation, while the other sums up the totals from the respective cyclic summation operations completed by said former accumulator. Thus, the dual totaling mechanism herein proposed is the one improved on conventional mechanisms, having a relatively simple, low cost construction.

The preferred embodiments of the mechanism of the present invention will now be described in the following with reference to the accompanying drawings. Of the components forming part of the mechanism described hereinafter, those not pertaining to the present invention, i.e. the amount representing means such as the setting-up carriage or key board, the operation mechanism of actuators such as toothed racks which are engageable with accumulator gears, and means for printing the calculated amounts may be made similar in frame to those disclosed, for example, in the United States Patents Nos. 3,297,246 and 3,260,447, and French Patent No. 1,355,921.

Figure 1:
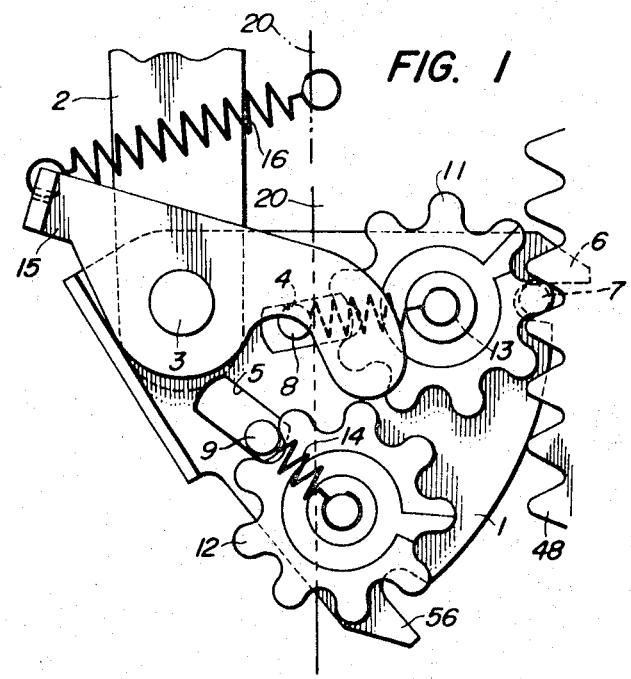
Figure 6:
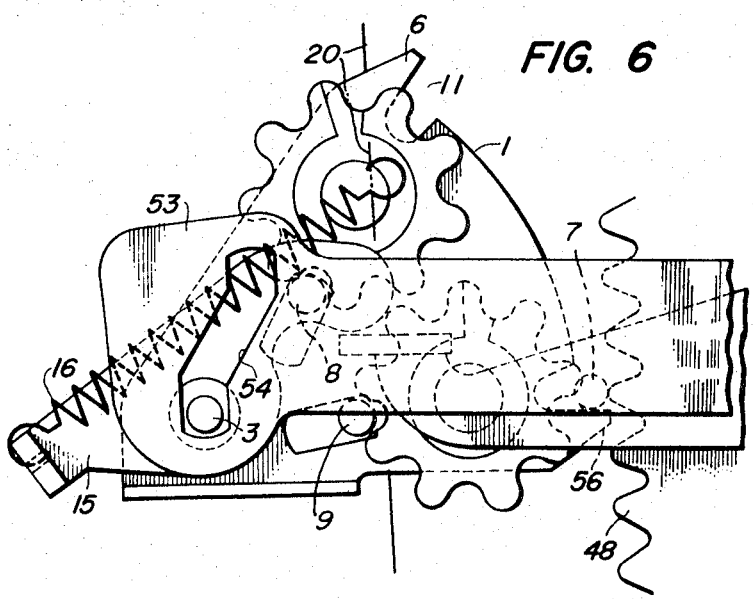
Figure 3A:
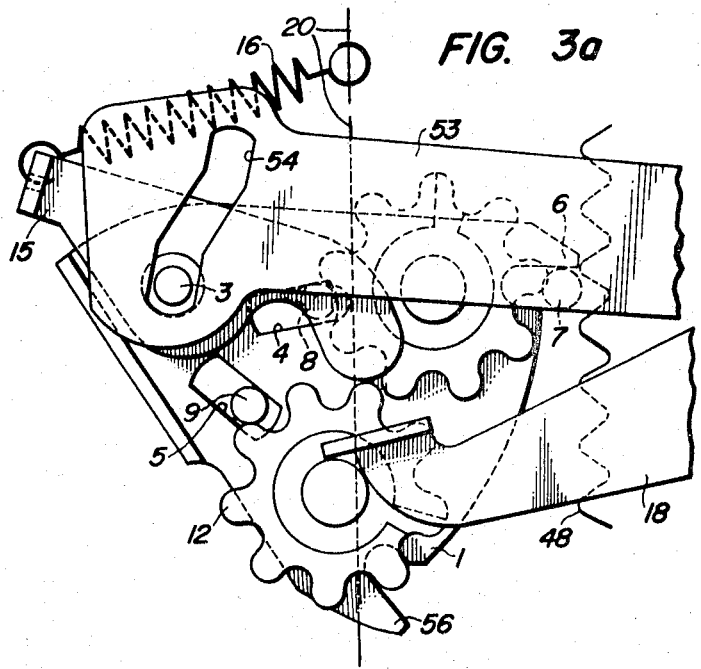
Figure 3B:
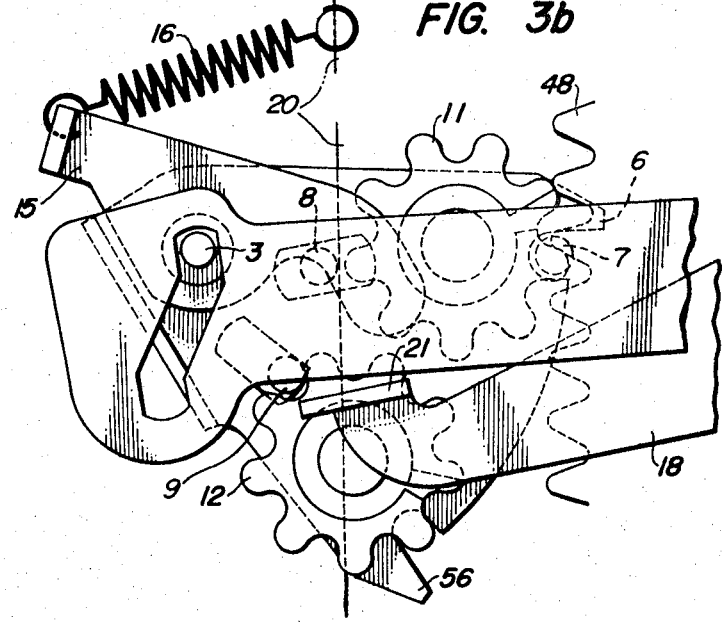

FIG. 1 is a side view of the accumulator gears section of the dual totaling mechanism embodying the present invention, FIG. 2 is a similar view of the dual totaling mechanism in its entirety, showing a first accumulator gear selected in the operation, FIGS. 3-a and 3-b each comprises a side view of said first accumulator gear section respectively, FIG. 4 is a sectional view taken along the line A—A of FIG. 2, FIG. 5 is a side view of the mechanism, showing a second accumulator gear selected in the operation, FIG. 6 is a side view of said second accumulator gear section, and FIG. 7 is a similar view of the accumulator gear selecting mechanism in the operation of transferring the value from said first accumulator gear to said second accumulator gear.

In FIGS. 1 and 2, the reference numeral 1 denotes a plate which supports the accumulator gears and is secured to a shaft 3, this shaft 3, in turn, being rotatably supported by a swing arm 2, and the projecting portion 6 in the upper right corner of the plate 1 is supported by a stop means 7 provided in the machine frame 20. The plate 1 is disposed one each on both right and left sides of the machine as viewed from the front thereof. Between the two plates 1 and rotatably supported by them are arranged a first accumulator gear 11 and a second accumulator gear 12, each in number corresponding to that of the digits the machine contains. Between the ends of the accumulator gear shafts and pins 8, 9 loosely fitted in the slots 4, 5 are hooked up tension springs 13, 14 respectively, these springs urging said pins 8, 9 toward the right in FIGURE 1 so that the pins are each in interlocked relation with the teeth of the accumulator gears to thus check the rotation thereof. On the shaft 3 is secured a lever 15, in the rear end of which is fastened a tension spring 16 whose other end is anchored on the machine frame 20, and by the resiliency of said tension spring 16, said shaft 3 and hence, the supporting plate 1 is in a state urged for clockwise rotation.

In FIG. 2, the numeral 18 represents a gear select lever which is pivotably mounted on the machine frame 20 by means of a member 19 and has its one end bent to form there an actuating billet 21 which is engageable with a lever 15, while the other end of said gear select lever 18 is provided with a roller follower 22 which rests on the gear select cam 23 under the influence of a spring 29, this spring being connected at one end to said lever 18 and secured at the other end to the machine frame 20. From said pin 25 in the gear select lever 18 is pivotably suspended a protection lever 24, the lower part of which is loosely passed through an opening 27 made in a stationary stopper plate 26 and is urged toward the right under the action of a tension spring 28. On the cam shaft 30 is secured a printing cam 31 on which is resting, under the influence of a spring 34, a pin or roller follower 35 provided in the end proximities of a printing lever 32 which is pivotably mounted on a pin 33. The lateral surface of said printing lever 32 is engaged by a pin 40 of a lever 38 which is pivotably mounted on a pin 37 and is connected with the releasing lever 41 by means of a pin 42, said releasing lever 41 letting a stationary pin 44 loosely in through a slot 43 provided therein and being urged upwardly and at the same time, to the right by means of a tension spring 45 which is fastened at one end to said releasing lever 41 and at the other end to the machine frame, thus effectuating said engagement between the pin 40 and the lateral surface of the lever 32.

FIG. 2 represents an operational phase wherein said first accumulator gear 11 has been selected, the switching key 46 being shown in its right-hand position and a wire means 47 for actuating the protection lever 24 connected to said switching key 46 being indicated in its inactive state with respect to said protection lever 24. Now, upon depression of the function key after a number key has been pressed down, the cam shaft 30 is actuated for clockwise rotation likewise in the actuating mechanism of conventional adding machines such as those disclosed, for example, in said United States Patents Nos. 3,297,246 and 3,260,447. And by consequence, the toothed rack 48 shown in FIG. 3 is moved upwardly by a distance corresponding to the digital value specified by the number key depressed and it stops, and there, in motion with said rack 48, the associated type bar is also moved upwardly by means of a mechanism which is similar to that disclosed, for example, in said French Patent No. 1,355,921 so that said type bar may be in readiness to effect printing of said digital value picked out. The roller follower 22 of the lever 18, on the other hand, falls into the recessed part of the cam disk 23 as a result of the rotation of the cam shaft 30, whereupon said lever 18 is urged to rotate clockwise, which, however, is hampered by the shoulder section 50 of the protection lever 24 being brought into abutment against the stopper plate 26, result, therefore, being that said lever 18 is brought into substantially such a position as shown in FIG. 2. There follows then the dropping of the pin 35 of the printing lever 32 into the recessed part of the cam disk 31, which induces the printing lever 32 to make swinging motion and thereby actuates the type bar to print said digital value on the paper roll as required. By said swinging motion of the printing lever 32, the lever 38 is pushed to make clockwise rotation, thereby causing the releasing lever 41 to be likewise pushed to the left, when, however, the bent end 51 of said releasing lever 41 being on the level higher than that of the shoulder section 52 of the protection lever 24, the releasing lever 41 is brought into position shown by the dot and dash line to stay there without effect on said protection lever 24. Upon completion of the printing operation cycle, an actuating lever 53 is swayed downwardly on a fulcrum (not shown) situated in the right hand portion thereof, and since there is provided in said actuating lever 53 an S-contoured cam slot 54 in which one end of the shaft 3 is loosely fitted, said lowering of the actuating lever 53 causes the shaft 3 to be moved to the right as it accompanies swaying motion of the swing arm 2 and thus drawn into position shown in FIG. 3–a, and by consequence, the first accumulator gear 11 is brought into mesh with the rack 48, as shown in FIG. 3–b. There supervenes then the stoppage of the pin 8 by its coming into abutment against the end face of the machine frame 20, while in the meantime, the first accumulator gear 11 continues to advance until the pin 8 comes out of interlocking with the teeth of the gear 11 and thus, the gear 11 is set free. And subsequent to that, the rack 48 comes down and accumulator gear 11 is thereby rotated by the amount corresponding to that of the upward travel previously made by the rack 48 and in this wise, the value is stored by the accumulator gear 11. There ensues then the upward movement of the actuating lever 53, whereby the supporting plate 1 is moved to the left and hence, the accumulator gear 11 comes out of mesh with the rack, a similar operation cycle being thus repeated every time a digital value key is depressed, wherein by depressing a total key, the printing of the sum obtained from the summation operation completed is achieved according to a known manner such as disclosed, for example, in said French Patent No. 1,355,921.

Description will now be made in the following with respect to the operational stage wherein said second accumulator gear 12 comes into play for aggregating and printing the total amounts being transferred from said first accumulator gear.

In reference to FIG. 5, the switching key 46 in the operation is pulled to the left into position shown by the solid line, whereby the wire means 47 causes the protection lever 24 to be once swung clockwise into position shown by the dot and dash line so that its shoulder section 50 is released away from the fringe of the stopper plate 26, and thereupon, the cam shaft 30 is rotated, the roller follower 22 of the lever 18 is let fall into the recessed part of the cam disk 23 and accordingly, said lever 18 is rotated clockwise and resultingly pushes the lever 15 upwards by means of the actuating billet 21 provided at the end of said lever 18, and consequently, the supporting plate 1 is rotated counter-clockwise about the shaft 3 until its stops, when its lower projection 56 comes into abutment against the stop means 7 and thus, the second accumulator gear 12 is brought into position where it faces the rack 48, this meaning that, when the actuating lever 53 is lowered after completion of the preceding operation including the printing of the involved value, the supporting plate 1 is moved to the right so that the second accumulator gear 12 is brought into mesh with the rack 48 and lays up the value as required by the downward motion of the rack 48, other particulars of said operation being similar to those earlier described with respect to the first accumulator gear 11.

The following is descriptive of an operational phase wherein the summation operation is conducted by the first accumulator gear 11, while only the total value from said summation operation is transferred to the second accumulator gear 12.

In order to achieve such operation, a transfer key 58 is depressed, as shown in FIG. 7, when its arm portion 60 presses down the bent portion 62 of the lever 61, thereby causing said lever 61 to rotate about the pin 64 counter-clockwise, and this rotation of the lever 61 is transmitted to, and brings the lever 65 into clockwise rotation about the pin 66. There, the bent portion 41 provided at the end of the lever 65 being in engagement with the releasing lever 41, this lever 41 is rotated about the shaft 42 downwardly so that its bent portion 51 is brought into position where it can engage the shoulder section 52 of the production lever 24. Incidentally, the switching key 46 is then held in its right hand position so that the first accumulator gear may take its position where it faces the rack 48.

When it is desired in the operation to make the first accumulator gear gather and total the amounts for several different machine cycles of summation, a total key is depressed for each cycle of such operation completed, and the operation of a cam mechanism (not shown) for driving the actuating lever 53 will be cyclically shifted, whereupon said lever 53 is lowered so that its position is changed from that in FIG. 3–a into that in FIG. 3–b. Meanwhile, the lever 18 is urged to rotate clockwise in motion with the rotated cam shaft 30, when, however, the protection lever 24 encountering the abutting surface of the stopper plate 26 in a similar manner as earlier described with reference to FIG. 2, the first accumulator gear 11 is brought into mesh with the rack 48 by said lowering of the actuating lever 53, and there ensues then the upward movement of the rack 48 by a distance corresponding to the value contained in the accumulator gear 11 and it stops, this being further ensued by the upward movement of said actuating lever 53 and it results in the gear 11 being brought out of mesh with the rack 48. The printing lever 32 then falls into the recessed part of the printing cam disk 31 to thus achieve the printing of the total value for each machine cycle of the summation operation.

In consequence of the swinging motion of the printing lever 32 just referred to in the preceding, the levers 38 and 41 are moved to the left and the bent portion 51 of said lever 41 pushes the protection lever 24 away from the position shown by the double dots and dash lines 24′ into that shown by the solid line. Consequently, the shoulder section 50 of the lever 24, becomes disengaged from the stopper plate 26, and this results in releasing the gear select lever 18, thereby permitting the lever to sway down under the action of the spring 29 until it is brought into contact with the bottom surface of the cam disk 23 which is already in rotary motion, and thus, the gear select lever 18 and the protection lever 24 are brought into positions shown by the dot-dash lines 18" and 24" respectively. By the swaying motion of the lever 18, the supporting plate 1 is rotated clockwise through the action of the lever 15, as earlier described, whereby the second accumulator gear 12 is brought into position where it faces the rack 48 in a similar manner as earlier described with reference to FIG. 5. Therefore, the actuating lever 53 moves downwards and the second accumulator gear 12 is sequentially brought into mesh with the rack 48, being followed then by the downward motion of the rack 48. This rotates the second accumulator gear 12 by the amount corresponding to that of the upward travel previously made by the rack 48, this amount of vertical movement made by the rack 48 standing for the very value that had been put into the first accumulator gear 11, and thus, the second accumulator gear 12 gets ready to take up said value being transferred from the first accumulator gear 11. Subsequent to this, the actuating lever 53 is lifted and the gear 12 is thereby brought out of mesh with the rack 48, whereupon the value stored in the first accumulator gear has been transferred to the second accumulator gear 12. Therefore, the totals from the respective cycles of summation operations carried out by the first accumulator gear 11 are aggregated by the second accumulator gear 12, wherein by pulling the switching key 46 to the left, the printing of the aggregated value stored in the second accumulator gear is achieved as described before.

We claim:

1. A dual totaling mechanism for an adding machine comprising,
    accumulator means having a first accumulator gear (11) and a second accumulator gear (12),
    said accumulator gears being rotatably held in spaced relation from each other on one supporting plate (1) and capable of performing the summation operation for separate amounts independently of each other,
    rack means (48) disposed adjacent to said two accumulator gears to be engageable with one of said gears selectively and adapted for movement over variable lengths according to the amounts entered for calculation,
    an actuating member (53) for operating said first and second accumulator gears to engage and disengage with said rack means (48) selectively,
    gear select means (18) for moving pivotally said supporting plate (1) to bring one of said two accumulator gears selectively into a position in which said selected accumulator gear faces said rack means (48),
    a control member (24) for limiting the movement of said gear select means (18),
    said control member being locked in non-operated condition by a stationary stopper (26),
    a releasing member (41) for releasing said control member (24) from said stopper,
    and total transfer means for transferring the totals stored in said first accumulator gear therefrom to said second accumulator gear,
    said total transfer means including a total transfer key (58) connected via connecting means (61, 65) to said releasing member (41) and for shifting the latter relative to said control member (24),
    means (32, 38) for actuating said releasing member (41) to release said control member (24) directly upon the completion of each printing operation of the total stored in said first accumulator gear,
    and means for effecting movement of said rack means (48) over variable lengths in one direction according to the total stored in said first accumulator gear when the latter is engaged with said rack means (48) and, after said movement of said rack means in said one direction, for effecting the movement of said rack means over equivalent lengths in the opposite direction when said second accumulator gear is engaged with said rack means, to thereby rotate said second accumulator gear to transfer thereto the total stored in said first accumulator gear.

2. A dual totaling mechanism for adding machine according to claim 1, said mechanism further comprising a switching key (46) to lock and release said control member (24) to thereby cause said first and second accumulator gears selectively to engage said rack means (48) and perform the summation operation independently of each other.

References Cited

UNITED STATES PATENTS

| | | | |
|---|---|---|---|
| 2,339,154 | 1/1944 | Crosman | 74—405 |
| 2,515,442 | 7/1950 | Drake | 74—422 X |
| 3,253,779 | 5/1966 | Chall. | |
| 3,348,769 | 10/1967 | Busch. | |
| 3,362,631 | 1/1968 | Englund et al. | |

LEONARD H. GERIN, Primary Examiner

U.S. Cl. X.R.

74—422; 235—60